(12) United States Patent  (10) Patent No.: US 7,693,272 B2
Klein  (45) Date of Patent: Apr. 6, 2010

(54) PROVIDING A FILE RELATING TO A TELEPHONE CALL

(75) Inventor: Udo Klein, Maximillansau (DE)

(73) Assignee: SAP Aktiengesellschaft, Walldorf (DE)

( * ) Notice: Subject to any disclaimer, the term of this patent is extended or adjusted under 35 U.S.C. 154(b) by 1273 days.

(21) Appl. No.: 10/732,598

(22) Filed: Dec. 10, 2003

(65) Prior Publication Data

US 2005/0129205 A1  Jun. 16, 2005

(51) Int. Cl.
H04M 3/42 (2006.01)
H04M 5/00 (2006.01)
H04M 3/00 (2006.01)

(52) U.S. Cl. .......................... 379/201.04; 379/265.02; 379/201.02

(58) Field of Classification Search ............ 379/265.02, 379/201.04
See application file for complete search history.

(56) References Cited

U.S. PATENT DOCUMENTS

| | | | | |
|---|---|---|---|---|
| 5,734,706 | A * | 3/1998 | Windsor et al. | 379/142.01 |
| 6,064,725 | A * | 5/2000 | Nakanishi | 379/140 |
| 2002/0031212 | A1* | 3/2002 | O'Neil et al. | 379/211.02 |
| 2004/0001579 | A1* | 1/2004 | Feinberg et al. | 379/156 |
| 2004/0132438 | A1* | 7/2004 | White | 455/418 |
| 2004/0153382 | A1* | 8/2004 | Boccuzzi et al. | 705/34 |
| 2004/0161097 | A1* | 8/2004 | Henry | 379/266.02 |
| 2009/0037958 | A1* | 2/2009 | Traw et al. | 725/46 |

OTHER PUBLICATIONS http://www.akwien.at/396_11161.htm, "AK Online", 5 pages, printed from the Internet on Nov. 13, 2003 (German).
http://babelfish.altavista.com/babelfish/urltrurl?url=http%3A%2F%2Fwww.akwien.at%2 . . . , "AK Online", 5 pages, printed from the Internet on Nov. 13, 2003.
http://www.cs.waikato,ac,nz/~nzd1.textmining/, "What is Text Mining?", 5 pages, printed from the internet on Nov. 13, 2003.
http://www.kdnuggets.com/software/classification.html, "Software for Classification", 1 page, printed from the Internet on Nov. 13, 2003.
http://www.kdnuggets.com/software/suites.html , "Software Suites for Data Mining and Knowledge Discovery", 3 pages, printed from the Internet on Nov. 13, 2003.
http://www.kdnuggets.com/software.text.html m Test Analysis, Text Mining, and Information Retrieval Software, 2 pages, printed from the Internet on Nov. 13, 2003.
http://www.modelandmine.com/bfaq.htm, "Model & Mine", 6 pages, printed from the Internet on Nov. 13, 2003.

(Continued)

*Primary Examiner*—Rasha S Al Aubaidi
(74) *Attorney, Agent, or Firm*—Fish & Richardson P.C.

(57) ABSTRACT

When a person receives an incoming telephone call, one or more files that the person is most likely to need are provided. The files are identified by analyzing information about what the person did in previous phone conversations with the same caller. That is, when the person opens files in the computer system during a phone call, this is recorded in a register that can be analyzed to identify the most likely needed files. Calls from more than one specific telephone number may be covered by the technique and several answering persons' actions may be tracked.

42 Claims, 3 Drawing Sheets

OTHER PUBLICATIONS http://www.kdnuggets.com/software/classification.html, "Software for Classification, CART® Data Mining Conference 2004", 1 page, printed from the Internet on Nov. 13, 2003.

http://www.kdnuggets.com/software/suites.html, "Software suites for Data Mining and Knowledge Discovery", 3 pages, printed from the Internet on Nov. 13, 2003.

http://www.noetica.com/products/productpages/tracker.htm, "Synthesys—Call Tracker", 3 pages, printed from the Internet on Nov. 12, 2003.

http://www.it-director.com/article.php?articleid=1119, Computer telephony Integration (CTI), dated Oct. 6, 2000, 4 pages, printed from the Internet on Nov. 12, 2003.

http://help.sap.com, "Telephony Server", 2 pages, printed from the Internet on Nov. 12, 2003.

http://www.newsengine.be, "Siemens EIT extends use of Selligent to call center", 2 pages, dated May 5, 2003, printed from the Internet on Nov. 12, 2003.

Corbett et al., *Back Up the Organisation: How Employees and Information Systems Re-member Organisational Practice*, Proceedings of the $32^{nd}$ Hawaii International Conference on system Sciences—1999, IEEE, 9 pages.

http://217.110.104.21/rde/xchg/SID-3F57F9FF-BAEE2AF/detewe/hs.xsl/de-4165.htm, "Pressemitteilungen 2003", 4 pages, printed from the Internet on Nov. 12, 2003.

Lucent Technologies brochure, "Snap Connection Software", dated Jul. 1998, 4 pages.

CIM Systems brochure, "Call Handling, Citizen Relationship Management", 2 pages, undated.

Aris, Product Overview, 72 pages, revised Jun. 13, 2001.

* cited by examiner

PROVIDING A FILE RELATING TO A TELEPHONE CALL

TECHNICAL FIELD

This description relates to providing a file relating to a telephone call.

BACKGROUND

Computer-telephony integration is often used when an organization wants to improve outward contact, such as contacts with its current or prospective customers. One example is a call center, where agents of the organization typically place or receive customer telephone calls. When a customer calls the organization, many call centers detect the customer's identity either by a caller identification service or by having the calling customer input an account number or other identification over the phone. Based on this identification, such a system may retrieve specific information from the computer system that is associated with the caller, such as the caller's account file or notes entered during an earlier call with the customer. The system can retrieve the records because it has stored a customer identifier either in the records or with them.

The relationship between the stored records (the customer file, notes, etc.) and the particular telephone call in the above examples is static. That is, the system provides the files because they have been purposely labeled in advance with the customer's identification. The system does not register whether the agent actually looks at records during any particular phone call. Moreover, the system does not take into account whether the agent frequently needs to look up another record while being on the phone with a particular customer.

The fact that only records purposely labeled in advance are provided during the phone call makes it less useful to implement such a system in environments other than a traditional call center. A person working in a human resources department of a large corporation, for example, may have daily telephone contact with a number of managers, employees and other personnel. Each of these calls may require the person to access different computer records. Moreover, the telephone calls in this and other examples are far less predictable than are calls a conventional call center. It would be difficult and impracticable to label the myriad available records with identifiers representing the broad group of people that call such that the records could be provided for the respective phone calls.

SUMMARY

The invention relates to files relating to a telephone call. In a first general aspect, a method comprises detecting an incoming telephone call that is to be handled by a person using a computer system. The incoming telephone call is placed using a specific telephone number, wherein a plurality of previous incoming telephone calls that were placed using the specific telephone number have been handled by the person while using the computer system. The method comprises providing the person with a first file that the person is most likely to need while handling the incoming telephone call. The first file is identified by analyzing information about any of a plurality of files accessible in the computer system that the person accessed during the previous incoming telephone calls.

In selected embodiments, analyzing the information may lead to identifying a subset of the plurality of files that the person is most likely to need while handling the incoming telephone call. The subset, including the first file, is provided to the person. The subset may include files associated with different applications in the computer system.

In a second general aspect, a method comprises detecting, over time, incoming telephone calls that are handled by a person using a computer system. The incoming telephone calls are placed using a specific telephone number. Information about any of a plurality of files accessible in the computer system that the person accesses during the incoming telephone calls is registered. The method comprises analyzing the registered information to identify a first file of the plurality of files that the person is most likely to need while handling a future incoming telephone call that is placed using the specific telephone number.

In selected embodiments, incoming telephone calls placed using more than one specific telephone number are detected. Files that the handling person is most likely to need when receiving a call from any of the specific telephone numbers can then be provided.

In selected embodiments, incoming calls handled by different persons are detected, and any or all of the persons can be provided with at least one file that the person is most likely to need during an incoming telephone call.

In a third general aspect, a computer system comprises a detected incoming telephone call, which telephone call is to be handled by a person that uses the computer system. The incoming telephone call is placed using a specific telephone number. A plurality of previous incoming telephone calls that were placed using the specific telephone number have been handled by the person while using the computer system. The system comprises a file providing module that provides the person with a first file that the person is most likely to need while handling the incoming telephone call. The first file is identified by analyzing information about any of a plurality of files accessible in the computer system that the person accessed during the previous incoming telephone calls.

In selected embodiments, an action tracking module registers the information about any of the plurality of files that the person accesses during the previous incoming telephone calls.

Selected embodiments include an analyzing module that analyzes the registered information to identify the first file. The analyzing module may use a data mining technique, a text mining technique, a machine learning technique or a method of statistical analysis in analyzing the registered information. The analyzing module may identify a subset of the plurality of files, including the first file, that the person is most likely to need while handling the incoming telephone call.

Advantages of the techniques described herein may include one or more of the following. Improved computer telephony integration. More efficient interaction over the telephone. Customizing the computer system to specific users by providing files that the specific users need. Reducing errors caused by persons inadvertently opening and editing the wrong file while being on the phone. Better monitoring of the use of a computer system during calls.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers in the various drawings indicate like elements.

DETAILED DESCRIPTION

Figure 1A:
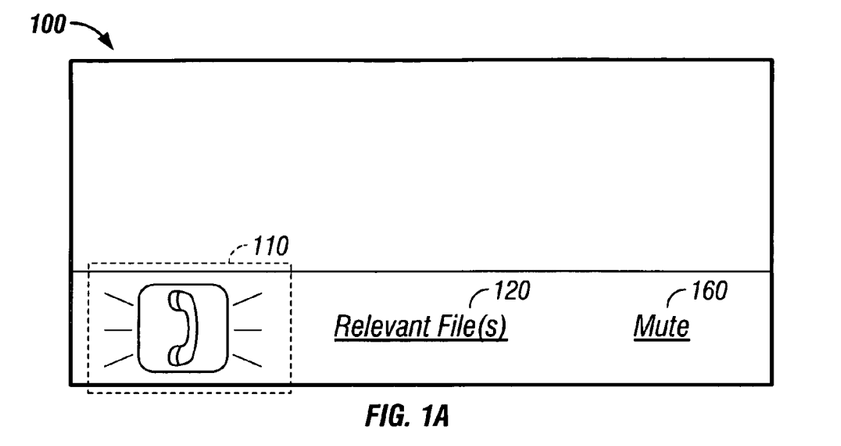
FIGS. 1A-C are exemplary views of a user interface that provides files relating to a telephone call.
Figure 1B:
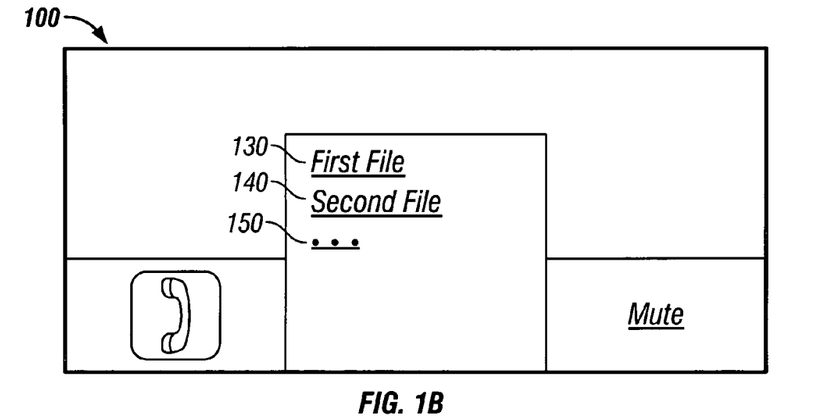
Figure 1C:
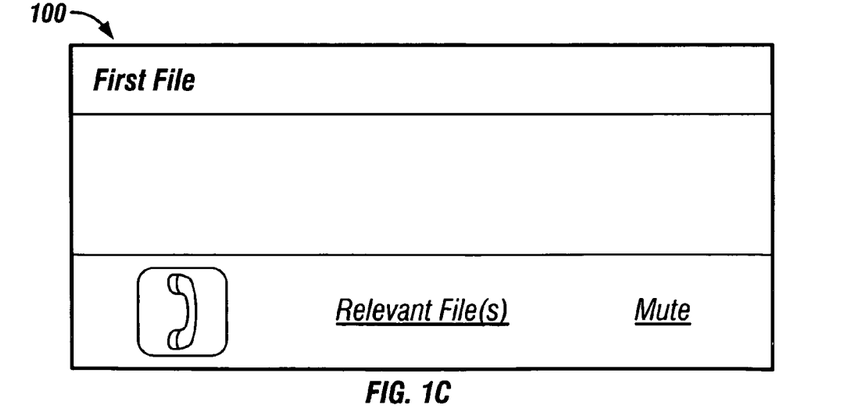

FIGS. 1A-C are examples of views that can be displayed in a user interface 100 to provide one or more files relating to an incoming telephone call. Assume that the person who is answering the call has access to a telephone and that the telephone connection is integrated with a computer system. For example, the person's telephone receiver unit is connected to the computer system. As another example, the person is operating a terminal of the computer system that lets her answer the telephone call using a microphone and speaker connected to the computer system (i.e., the person need not have a physical receiver separate from the computer system). The computer system may display a symbol 110 to inform the person that an incoming telephone call is being detected.

While handling the telephone call, the person may decide to open a file that relates to the caller or to the reason for the telephone call. For example, the caller may have asked a question that requires the person to look in a file. As another example, the caller may be sharing information that the person wishes to record in a particular file. Moreover, it may be the case that the person has received several telephone calls from this specific number in the past, and that the person usually looks in one or more files while handling those calls. Based on the person's activities during the previous calls, it may be possible to identify one or more files as being the ones that the person most likely needs while handling an incoming call from this specific caller. Such file name(s) may be stored in the system, associated with identification of the caller (or the specific telephone number used for the call), such that the system can provide them after detecting the incoming telephone call. Preferably, the system provides the file(s) almost instantaneously after detecting the call. The benefit of providing the file(s) is reduced if it is quicker for the person to open them manually. The system may provide such most likely needed file(s) by displaying a "Relevant File(s)" control 120 in the user interface 100.

If the person activates control 120, which in this example is a link, the user interface may display links to the at least one file that is determined to be most likely needed, for example as shown in FIG. 1B. A menu window may contain a link 130 to a first file and a link 140 to a second file. The person can access the files by activating their respective link. Thus, the system provides the first and second files to the person by displaying the control 120 by which the person can reach the links 130 and 140. More than two files may be provided, as indicated by the symbol 150.

If the person activates link 130, the system opens the first file in the user interface 100. FIG. 1C schematically shows the first file being open. Thus, the person now has the first file open in the user interface while handling the particular incoming telephone call. Should the person need access to any other of the files determined to be most likely needed, they can be reached using control 120.

The user interface 100 in this example includes a mute control 160 that the person can use to avoid being disturbed by incoming telephone calls. That is, activating the control 160 may block the symbol 110 from appearing until after person removes the muting. Preferably, the system does not provide any most likely needed files to the person while the telephone is muted. That is, the control 120 may be tied to the symbol 110 such that when the mute control 160 is activated, neither the symbol 110 nor the control 120 appears when an incoming telephone call is received.

Figure 2:
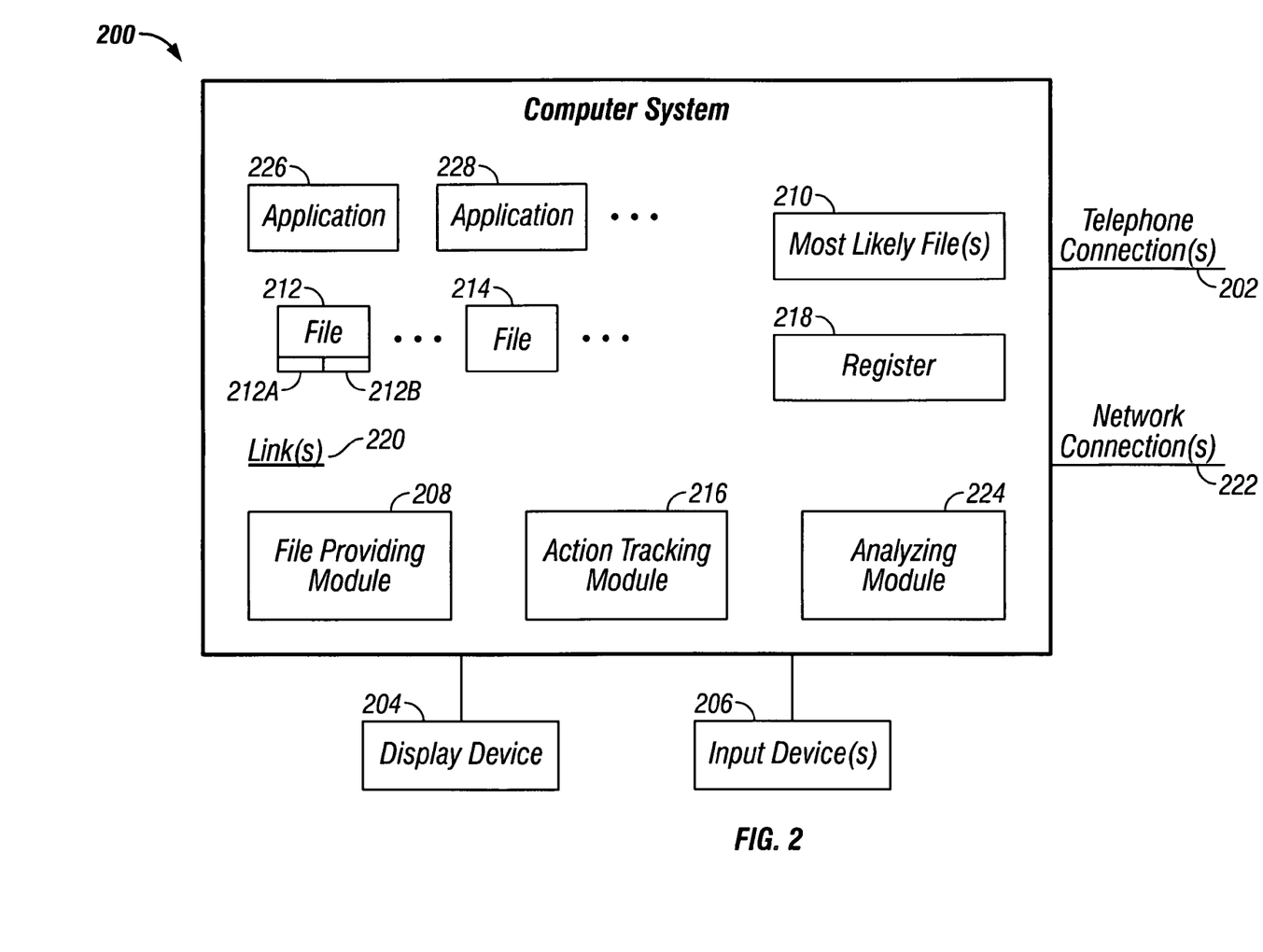
FIG. 2 is an example of a computer system that can produce the views shown in FIGS. 1A-C.

FIG. 2 schematically shows a system 200 that can produce the views shown in FIGS. 1A-C. That is, the system 200 is capable of providing a file that the person is most likely to need while handling an incoming telephone call. The system 100 is capable of analyzing the person's activities during telephone calls and determining which file(s) to provide for a specific caller.

The system 200 detects the incoming phone call on telephone connection(s) 202 that connect the system 200 to a telephone network, such as a public telephone network that exists in most countries. The person handling the incoming call can interact with the system 200 using a display device 204 and input device(s) 206 operably connected to the system 200. For example, the system 200 can alert the person to the incoming phone call using the symbol 110 displayed in the user interface 100 that can be presented on display device 204.

The system 200 may provide a file that the person is most likely to need while handling the telephone call. A file providing module (FPM) 208 may access a "Most Likely File(s)" record 210 that is associated with the answering person and with the particular caller. The FPM 208 may provide the file(s) to the person through control 120. That is, the FPM 208 may retrieve file identifier(s) from record 210 and use them to populate the control 120 such that the person can access the file(s). In this example, the FPM 208 retrieves the identities of a first file 212 and a second file 214 from the record 210 as being most likely needed and includes in the control 120 the link 130 to the first file 212 and the link 140 to the second file 214. Thus, the system 200 provides the person with the first file 212 and the second file 214.

The FPM 208 can provide the most needed file by opening it in the user interface 100 when the incoming call is detected. This may, however, be distracting to the person in some situations. Instead, the FPM 208 can provide the file such that the person becomes aware that it is being provided only if the person takes a specific action in the system 200. An example of this approach is the control 120, which displays the most likely needed file(s) only if the person activates it. As another example, the FPM 208 can provide the file after the person opens an application that is capable of presenting the file. That is, if the person opens the application while being on the phone, the FPM 208 may provide the most needed file (for example in form of a list) that is associated with that application. There may be most likely needed files associated with different applications in the system 200. Depending on which application the person chooses to open, the FPM 208 may provide those of the most likely needed files that are associated with the chosen application. Accordingly, a file can be deemed most likely needed on a global basis among all accessible files or on a local basis among the files belonging to a particular application.

The system 200 may monitor the person's activities during telephone calls for purposes of identifying files to be identified in the "Most Likely File(s)" record 210. An action tracking module (ATM) 216 may register files that the person accesses during incoming telephone calls. That is, if the person accesses the first file 212 and the second file 214 while handling a telephone call, the ATM 216 may store the file identities in a register 218 such that they are associated with the specific telephone number from which the call was received.

For example, the ATM 216 may store the caller's telephone number, the person's user identification in the system 200, and the accessed file(s) in a table in register 218. If the file 212 includes more than one individually identifiable portion (212A, 212B), the ATM 216 may register an identifier for the accessed portion in the register 218. The ATM 216 may register a time stamp for the time when the person accesses the file. The time stamp may be used for matching the file access with the specific caller. As another example, the time stamp may be used to weigh accesses to files depending on how long ago they occurred. Where a file, such as the first file 212, can be accessed using more than one method in the system 200, the ATM 216 may register the particular method that the person uses, such as a specific transaction that gives access to the first file 212 or a particular function of such a transaction. Thus, the ATM 216 may store any information that at a later time may be used to provide the file to the person.

The file(s) accessed by the person may be those that are stored in the system 220, such as the exemplary files 212 and 214. The system 200 may also provide links 220, perhaps displayable in the user interface 100, by which the user can access files stored outside the system 200. Such files may be accessed through network connection(s) 222. The ATM 216 may register the person's use of link(s) 220 while handling a call from a specific phone number such that, if a file that the person accesses by linking to it is deemed most likely needed, the link 220 can be used in providing the person with the file.

The ATM 216 registers if the person accesses a file provided by FPM 208. That is, the ATM 216 preferably does not register the mere providing of the file as an access unless the person actually opens the file.

The system 200 may analyze the activities that a person engages in while handling telephone calls from specific callers. For example, an analyzing module (AM) 224 may analyze the information registered in register 218 to determine the file(s) that the person is most likely to need while on the phone. The AM 224 may use any suitable data mining technique, text mining technique, machine learning technique or method of statistical analysis. As a very simple example, the AM 224 may operate according to an "all or nothing" approach: only the file(s) that the person has accessed during every previous telephone call from a specific number will be deemed a most likely needed file. This is the same as requiring the predicted probability based on previous calls that the file will be accessed to be 100%. An advantage of this approach is that the system 200 does not distract the person by providing files that are not used during every call.

An even more useful approach may be to include any files that, judging by the past events, will be needed with a high (say 90% or more) probability. That is, among the files that the person has accessed while being on the phone with a particular caller, the AM 224 determines which file(s) the person will need with a sufficiently high likelihood.

Register 218 may have stored therein many instances where the person accessed a file (or files) while handling a call. The AM 224 may use each of these instances in determining the most likely needed files. The AM 224 need not, however, give each instance the same weight. Rather, the AM 220 may weight the instances differently. For example, the AM 220 may give less weight to files that were accessed a long time ago during conversation with a caller than to files that the person recently accessed while on the phone with the same caller. As another example, register 218 may contain information about accessed files that the person closed momentarily after opening them, because this may indicate that they were opened by mistake.

The particular technique used by the AM 224 to identify the most likely file(s) may determine which file(s) it eventually identifies. This may in turn drive the selection of one technique over another. But whatever technique is used, the AM 224 is preferably always configured so that it performs its function—identifying the file(s) most likely needed by the person—to satisfaction.

The AM 224 may identify one file or more than one file as being most likely needed depending on the used technique and on the particular registered past file accesses. In other words, the AM 224 may identify a subset of the available files as being the ones most likely needed. It may also happen that the AM 224 does not identify any file in some situation. But if the AM 224 identifies at least one file by analyzing the information in register 218, it may record the identified file(s) in the "Most Likely File(s)" record 210. For example, the AM 224 may store in the record 210 an identifier for each such file such that the file can be provided to the person using the identifier. If there are multiple most likely files, their relative significance may be preserved in the record 210, for example so that they can be provided to the person in form of a "top three" list or equivalent. The FPM 208 accesses record 210 when needed so that it can provide the most likely file(s) to the person.

The ATM 216 can track actions taken in more than one application in the computer system 200. Assume for example that the first file 212 is associated with a first application 226 and that the second file 214 is associated with a second application 228. The ATM 216 may detect whether, in the first application 226, the person opens the first file 212 or any other file(s) associated with that application. The ATM 216 may detect whether, in the second application 228, the person opens the second file 214 or any other files associated with that application. Indeed, the ATM 216 may be able to track any access to a file that the person makes using the computer system 200.

The block components of computer system 200 described above may be separate, as schematically shown in FIG. 2, or joined into one unit. In some implementations, one or more components may be located on a remote device, such as one that can be reached through network connection(s) 222. In a particular example, a number of client devices may be connected to the computer system 200 such that the users of the client devices can handle the incoming telephone calls. In such an implementation, the client device may store the information about accessed files as the phone calls are being handled. The registered information may then be shared with the computer system 200 (acting as a server) at appropriate times.

Figure 3A:
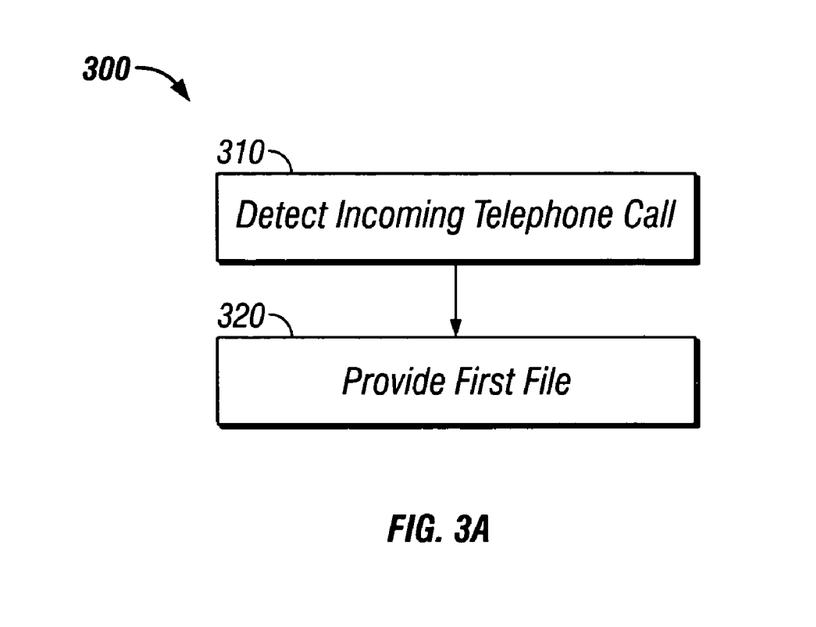
FIG. 3A is a flow chart of a method of providing a file relating to a telephone call.
Figure 3B:
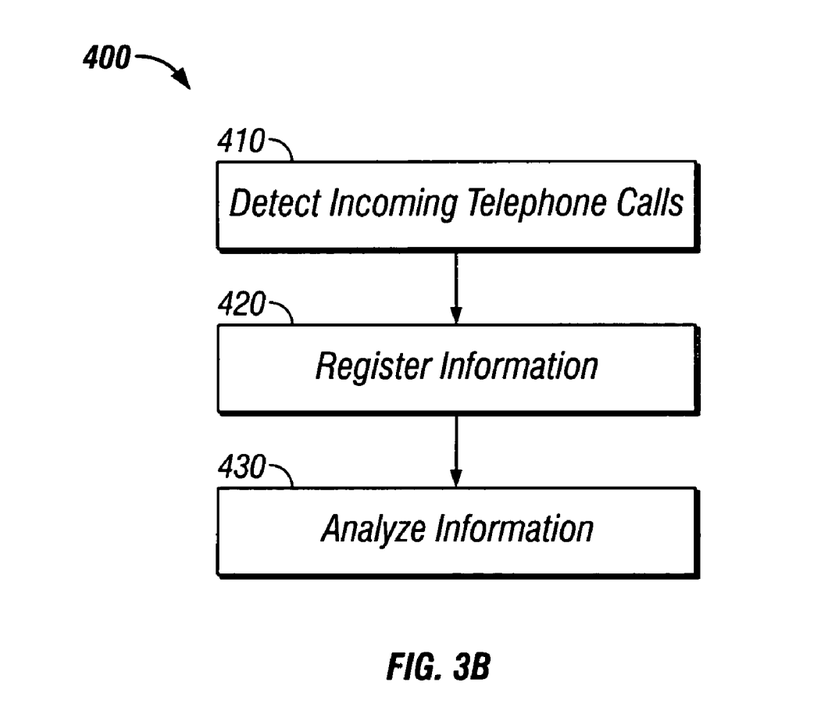
FIG. 3B is a flow chart of a method of maintaining files relating to a telephone call.

FIG. 3A is a flow chart of a method 300 for providing a file relating to an incoming telephone call. FIG. 3B is a flow chart of a method 400 for managing files relating to an incoming telephone call. Preferably, the method 300 is performed by the computer system 200. For example, a computer program product can include instructions that cause a processor of the system 200 to execute the steps of method 300. Preferably, the method 400 is performed by the computer system 200. For example, a computer program product can include instructions that cause a processor of the system 200 to execute the steps of method 400.

As shown in FIG. 3A, method 300 of providing first file 212 includes the following steps:

Detecting 310 an incoming telephone call that is to be handled by a person using a computer system. The incoming call is placed using a telephone number from which a plurality of calls have previously been received and handled by the person.

Providing 320 the person with the first file 212 that the person is most likely to need while handling the telephone call. The first file 212 is identified by analyzing information about any file in the computer system that the person accessed during the previous calls.

As shown in FIG. 3B, method 400 of managing files relating to incoming telephone calls includes the following steps:

Detecting 410, over time, incoming telephone calls that are handled by a person using a computer system. The incoming calls are placed using a specific telephone number.

Registering 420 information about any file accessible in the computer system that the person accesses during the incoming telephone calls.

Analyzing 430 the registered information to identify a first file 212 that the person is most likely to need while handling a future incoming telephone call.

Method 400 may serve as the preparation for performing method 300. That is, the file that is identified in analyzing 430 the information in method 400 may be the file that is provided 320 in method 300. Moreover, the step of registering 420 information in method 400 may be performed concurrently with providing 320 the file in method 300. That is, if the person accesses the first file that is provided 320 in method 300, this may be registered 420 as part of method 400.

Some implementations may be different from the examples shown above. For example, it is possible to track a person's actions with regard to more than one caller. That is, the registered information may pertain to incoming telephone calls from more than one specific number.

As another example, it is possible to track actions by several users of the computer system. That is, the registered information may pertain to incoming telephone calls that are handled by different persons. As mentioned just above, for each of such several persons the registered information may pertain to more than one caller.

As yet another example, the systems and techniques described herein can be used outside of a business setting, such as at home or in a public place.

Data in the files that are tracked and provided by the system and techniques described above may be sensitive. Appropriate protection must therefore be provided to avoid illegal or unauthorized use. Confidential information should be stored in protected system areas. For example, sensitive data stored on a client side of a network may be protected using encryption. The system should be configured such that it does not run afoul of privacy regulation, including rules protecting the privacy of the person using the system. For example, the collected information should be protected so that it is not improperly used for behavior monitoring.

The invention can be implemented in digital electronic circuitry, or in computer hardware, firmware, software, or in combinations of them. Apparatus of the invention can be implemented in a computer program product tangibly embodied in an information carrier, e.g., in a machine-readable storage device or in a propagated signal, for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The invention can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A method of providing a file relating to an incoming telephone call, the method comprising:

detecting an incoming telephone call that is to be handled by a person using a computer system having a graphical user interface, the incoming telephone call being placed using a specific telephone number, wherein (i) a plurality of previous incoming telephone calls that were placed using the specific telephone number have been handled by the person while using the computer system, and (ii) the person's activities in accessing at least one file in the computer system during the previous incoming telephone calls were registered;

retrieving from a record a first file identifier based on the first file identifier being associated with the person and with the specific telephone number; and displaying in the graphical user interface a control populated with the first file identifier, the control providing the person access to a first file identified by the first file identifier and that meets a relevance criterion with regard to the incoming telephone call, the first file identifier having been added to the record based on analyzing which of a plurality of files accessible in the computer system that the person accessed during the previous incoming telephone calls, wherein a second file of the plurality of files that does not meet the relevance criterion is not identified in the record, based on the second file not meeting the relevance criterion.

2. The method of claim 1, wherein the first file is stored in the computer system.

3. The method of claim 1, wherein the first file is stored outside the computer system such that it is accessible in the computer system.

4. The method of claim 1, wherein displaying the control comprises displaying a link to the first file that the person can activate to gain access to the first file.

5. The method of claim 1, wherein the control is displayed in response to the user taking an action in the computer network.

6. The method of claim 5, wherein the control is displayed after the person opens an application in the computer system, wherein the application is capable of presenting the first file to the person.

7. The method of claim 1, wherein the first file comprises a plurality of portions and wherein analyzing the information led to identification of a first portion that meets the relevance criterion with regard to the incoming telephone call, wherein providing the person access to the first file comprises providing the person access to the first portion.

8. The method of claim 1, wherein analyzing the information led to identification of a subset of the plurality of files that meet the relevance criterion with regard to the incoming telephone call, the subset including the first file, farther comprising providing the person with the subset.

9. The method of claim 8, wherein the subset is provided in a list menu included in the control where the person can select any file in the subset.

10. The method of claim 8, wherein the first file is associated with a first application in the computer system and wherein a third file in the subset is associated with a second application in the computer system.

11. A method of managing files relating to incoming telephone calls, the method comprising:

detecting, over time, incoming telephone calls that are handled by a person using a computer system, the incoming telephone calls being placed using a specific telephone number;

registering which of a plurality of files accessible in the computer system that the person accesses during the incoming telephone calls; and analyzing registered information to identify a first file of the plurality of files that meets a relevance criterion with regard to a future incoming telephone call that is placed using the specific telephone number, and storing a first file identifier for the first file in a record, wherein a second file of the plurality of files that does not meet the relevance criterion is not identified in the record, based on the second file not meeting the relevance criterion.

12. The method of claim 11, wherein registering the information comprises registering the specific telephone number and registering an identify of any of the plurality of files that the person accesses during the incoming telephone calls.

13. The method of claim 11, wherein registering the information comprises registering a time stamp when the person accesses any of the plurality of files.

14. The method of claim 11, wherein registering the information comprises registering a specific method that the person uses in accessing any of the plurality of files.

15. The method of claim 11, wherein registering the information comprises registering a user identification of the person in the computer system.

16. The method of claim 11, wherein at least the first file comprises a plurality of portions and wherein registering the information comprises registering any of the plurality of portions that the person accesses.

17. The method of claim 11, further comprising storing the registered information in a register and analyzing the registered information stored in the register.

18. The method of claim 11, wherein analyzing the registered information comprises identifying a subset of the plurality of files that meet the relevance criterion with regard to the future incoming telephone call, the subset including the first file.

19. The method of claim 11, further comprising:

detecting, over time, other incoming telephone calls that are handled by a second person using the computer system, the other incoming telephone calls being placed using a certain telephone number;

registering second information about any of the plurality of files that the second person accesses during the other incoming telephone calls; and analyzing the registered second information to identify a third file of the plurality of files that meets a relevance criterion with regard to any telephone call in the future that is placed using the certain telephone number.

20. A computer system comprising:

a graphical user interface;

an incoming telephone call detected in the computer system, which telephone call is to be handled by a person that uses the computer system, the incoming telephone call being placed using a specific telephone number, wherein (i) a plurality of previous incoming telephone calls that were placed using the specific telephone number have been handled by the person while using the computer system, and (ii) the person's activities in accessing at least one file in the computer system during the previous incoming telephone calls were registered; and a file providing module that (i) retrieves from a record a first file identifier based on the first file identifier being associated with the person and with the specific telephone number, and (ii) displays in the graphical user interface a control populated with the first file identifier, wherein the control provides the person access to a first file identified by the first file identifier and that meets a relevance criterion with regard to the incoming telephone call, the first file identifier having been added to the record based on analyzing which of a plurality of files accessible in the computer system that the person accessed during the previous incoming telephone calls, wherein a second file of the plurality of files that does not meet the relevance criterion is not identified in the record, based on the second file not meeting the relevance criterion.

21. The computer system of claim 20, wherein the first file is stored in the computer system.

22. The computer system of claim 20, wherein the first file is stored outside the computer system such that it is accessible in the computer system.

23. The computer system of claim 20, wherein the file providing module displays a link to the first file that the person can activate to gain access to the first file.

24. The computer system of claim 20, wherein the file providing module displays the control after the user takes an action in the computer network.

25. The computer system of claim 24, wherein the file providing module displays the control after the person opens an application in the computer system, wherein the application is capable of presenting the first file to the person.

26. The computer system of claim 20, further comprising an action tracking module that registers the information about any of the plurality of files that the person accesses during the previous incoming telephone calls.

27. The computer system of claim 26, wherein the action tracking module registers the specific telephone number and an identity of any of the plurality of files that the person accesses.

28. The computer system of claim 26, wherein the action tracking module registers a time stamp when the person accesses any of the plurality of files.

29. The computer system of claim 26, wherein the action tracking module registers a specific method that the person uses in accessing any of the plurality of files.

30. The computer system of claim 26, wherein the action tracking module registers a user identification of the person in the computer system.

31. The computer system of claim 26, wherein at least the first file comprises a plurality of portions and wherein the action tracking module registers any of the plurality of portions that the person accesses.

32. The computer system of claim 26, wherein the action tracking module stores the information in a register.

33. The computer system of claim 32, wherein an analyzing module analyzes the information in the register to identify the first file.

34. The computer system of claim 20, further comprising an analyzing module that analyzes the registered information to identify the first file.

35. The computer system of claim 34, wherein the analyzing module uses at least one of a data mining technique, a test mining technique, a machine learning technique and a method of statistical analysis in analyzing the registered information.

36. The computer system of claim 34, wherein the analyzing module identifies a subset of the plurality of files that meet a relevance criterion with regard to the incoming telephone call, the subset including the first file, and wherein the file providing module provides the person with the subset.

37. The computer system of claim 36, wherein the file providing module provides the subset in a list menu where the person can select any file in the subset.

38. The computer system of claim 36, wherein the first file is associated with the first application in the computer system and wherein a third file in the subset is associated with a second application in the computer system.

39. The computer system of claim 20, further comprising a mute control by which the person can prevent the first file from being provided and prevent the computer system from signaling the incoming telephone call.

40. A computer program product containing executable instructions that when executed cause a processor to perform operations comprising:
  detect an incoming telephone call that is to be handled by a person using a computer system having a graphical user interface, the incoming telephone call being placed using a specific telephone number, wherein (i) a plurality of previous incoming telephone calls that were placed using the specific telephone number have been handled by the person while using the computer system, and (ii) the person's activities in accessing at least one file in the computer system during the previous incoming telephone calls were registered;
  retrieve from a record a first file identifier based on the first file identifier being associated with the person and with the specific telephone number; and
  display in the graphical user interface a control populated with the first file identifier, the control providing the person access to a first file identified by the first file identifier and that meets a relevance criterion with regard to the incoming telephone call, the first file identifier having been added to the record based on analyzing which of a plurality of files accessible in the computer system that the person accessed during the previous incoming telephone calls, wherein a second file of the plurality of files that does not meet the relevance criterion is not identified in the record, based on the second file not meeting the relevance criterion.

41. A computer program product containing executable instructions that when executed cause a processor to perform operation comprising:
  detect, over time, incoming telephone calls that are handled by a person using a computer system, the incoming telephone calls being placed using a specific telephone number;
  register which of a plurality of files accessible in the computer system that the person accesses during the incoming telephone calls; and
  analyze registered information to identify a first file of the plurality of files that meets a relevance criterion with regard to a future incoming telephone call that is placed using the specific telephone number, and store a first file identifier for the first file in a record, wherein a second file of the plurality of files that does not meet the relevance criterion is not identified in the record, based on the second file not meeting the relevance criterion.

42. A method of providing a file relating to a person engaged in communication, the method comprising:
  detecting, in a computer system having a graphical user interface, that a first person initiates a communication with a second person, wherein (i) a plurality of previous communications from the first person have been handled by the second person while using the computer system, and (ii) the person's activities in accessing at least one file in the computer system during the previous communications were registered;
  retrieving from a record a file identifier based on the first file identifier being associated with the first person and with the second person; and
  displaying in the graphical user interface, in response to the detection, a control populated with the file identifier, the control providing the second person access to a file identified by the file identifier and that meets a relevance criterion with regard to the first person, the file identifier having been added to the record based on analyzing which of a plurality of files accessible in the computer system that the second person accessed during the plurality of previous communications, wherein a second file of the plurality of files that does not meet the relevance criterion is not identified in the record, based on the second file not meeting the relevance criterion.

* * * * *